US012606424B2

(12) United States Patent
Nolan et al.

(10) Patent No.: US 12,606,424 B2
(45) Date of Patent: Apr. 21, 2026

(54) DIGITAL INTERFACE FOR A MANUAL COUNTERWEIGHT HOIST

(71) Applicant: Electronic Theatre Controls, Inc., Middleton, WI (US)

(72) Inventors: Timothy P. Nolan, Madison, WI (US); Kenric Gibbs, Dane, WI (US); Steven Ricks, Lodi, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 672 days.

(21) Appl. No.: 18/151,573

(22) Filed: Jan. 9, 2023

(65) Prior Publication Data

US 2023/0234814 A1 Jul. 27, 2023

Related U.S. Application Data

(60) Provisional application No. 63/303,092, filed on Jan. 26, 2022.

(51) Int. Cl.
*B66D 1/00* (2006.01)
*A63J 1/02* (2006.01)
*B66D 1/04* (2006.01)
*B66D 1/60* (2006.01)

(52) U.S. Cl.
CPC ................ *B66D 1/04* (2013.01); *A63J 1/028* (2013.01); *B66D 1/60* (2013.01); *B66D 2700/023* (2013.01); *B66D 2700/03* (2013.01)

(58) Field of Classification Search
None
See application file for complete search history.

(56) References Cited

U.S. PATENT DOCUMENTS

| | | | | |
|---|---|---|---|---|
| 5,992,655 | A | 11/1999 | Greenberg et al. | |
| 6,000,563 | A | 12/1999 | Greenberg | |
| 7,252,203 | B2 | 8/2007 | Frankenberger et al. | |
| 7,264,228 | B2 * | 9/2007 | Kaiser .................. | B66D 1/7405 254/338 |
| 7,275,733 | B2 | 10/2007 | Svitavsky et al. | |
| 7,364,044 | B2 | 4/2008 | Hinata | |

(Continued)

FOREIGN PATENT DOCUMENTS

| | | |
|---|---|---|
| WO | 1993/000285 A1 | 1/1993 |
| WO | 2003/040016 A1 | 5/2003 |

(Continued)

*Primary Examiner* — Emmanuel M Marcelo
(74) *Attorney, Agent, or Firm* — Michael Best & Friedrich LLP

(57) ABSTRACT

A manually operated counterweight hoist including a batten operable to support a load, an arbor operable to support one or more counterweights, a hand line operable to move the batten or the arbor, a brake operable to prevent movement of the arbor and the batten by constricting movement of the hand line, a brake actuator operable to activate the brake, a sensor that measures a speed of the arbor, and a controller including an electronic processor. The controller is operatively coupled to the sensor and the brake actuator. The controller is configured to receive a measurement signal from the sensor, determine whether the speed of the arbor exceeds a threshold based on the measurement signal, and activate the brake actuator when the speed of the arbor exceeds the threshold.

22 Claims, 6 Drawing Sheets

(56) References Cited

U.S. PATENT DOCUMENTS

| | | | | |
|---|---|---|---|---|
| 8,152,412 | B2 | 4/2012 | Davis | |
| 9,988,247 | B2 | 6/2018 | Iwazawa | |
| 10,495,880 | B2 | 12/2019 | Rantala et al. | |
| 10,703,612 | B2 | 7/2020 | Albinger et al. | |
| 10,782,202 | B2 | 9/2020 | Bonnet et al. | |
| 11,053,105 | B2 | 7/2021 | Sembo | |
| 2007/0181862 | A1* | 8/2007 | Hossler | A63J 1/028 254/292 |
| 2011/0278252 | A1 | 11/2011 | De Carvalho et al. | |
| 2015/0090946 | A1* | 4/2015 | Schwaiger | B66D 3/20 254/362 |
| 2016/0096710 | A1* | 4/2016 | Hanley | B66D 1/12 254/362 |
| 2016/0169413 | A1 | 6/2016 | Camacho et al. | |
| 2019/0031474 | A1 | 1/2019 | Stilborn et al. | |
| 2020/0025640 | A1 | 1/2020 | Bonnet et al. | |
| 2020/0277175 | A1 | 9/2020 | Rushton et al. | |
| 2020/0277176 | A1 | 9/2020 | Rushton | |
| 2021/0002111 | A1 | 1/2021 | Rushton et al. | |
| 2021/0033482 | A1 | 2/2021 | Bonnet et al. | |
| 2021/0094803 | A1 | 4/2021 | Caldwell et al. | |
| 2021/0171322 | A1 | 6/2021 | Yamaguchi et al. | |

FOREIGN PATENT DOCUMENTS

| | | | |
|---|---|---|---|
| WO | 2004/089804 | A1 | 10/2004 |
| WO | 2008/036100 | A1 | 3/2008 |
| WO | 2009/148963 | A1 | 12/2009 |
| WO | 2017/032922 | A1 | 3/2017 |
| WO | 2018/074532 | A1 | 4/2018 |
| WO | 2020/013320 | A1 | 1/2020 |

* cited by examiner

DIGITAL INTERFACE FOR A MANUAL COUNTERWEIGHT HOIST

RELATED APPLICATIONS

This application claims the benefit of U.S. Provisional Patent Application No. 63/303,092, filed Jan. 26, 2022, the entire content of which is hereby incorporated by reference.

FIELD

Embodiments described herein relate to manually operated counterweight hoists.

SUMMARY

Theaters or performance spaces include hoists that are motorized and controlled by a digital rigging control system. However, due to budgetary limitations, many theaters include only a few motorized hoists and many more manually operated counter-weight hoists. These manually operated counterweight hoists do not include some modern safety features. Furthermore, these existing manually operated counterweight hoists are not integrated with a digital rigging control system.

In some aspects, manually operated counterweight hoists described herein include a batten operable to support a load, an arbor operable to support one or more counterweights, a hand line operable to move the batten or the arbor, a brake operable to prevent movement of the arbor and the batten by constricting movement of the hand line, a brake actuator operable to activate the brake, a sensor that measures a speed of the arbor, and a controller including an electronic processor. The controller is operatively coupled to the sensor and the brake actuator. The controller is configured to receive a measurement signal from the sensor, determine whether the speed of the arbor exceeds a threshold based on the measurement signal, and activate the brake actuator when the speed of the arbor exceeds the threshold.

In some aspects, methods described herein provide for a method of operating a manually operated counterweight hoist that includes an arbor, a hand line operable to move the arbor, a brake operable to prevent movement of the arbor, a brake actuator operable to activate the brake, a sensor that measures a speed of the arbor, and a controller that includes an electronic processor and is operatively coupled to the brake actuator and sensor. The method includes moving, by the hand line, the arbor, receiving, by the controller, a measurement signal from the sensor, determining, by the controller, whether a speed of the arbor exceeds a threshold based on the measurement signal, activating, by the controller, the brake actuator when the speed of the arbor exceeds the threshold, and constricting, by the brake, the hand line in response to activating the brake actuator.

In some aspects, systems described herein include a motorized hoist, a manually operated counterweight hoist, and a system control device that is operatively coupled to the motorized hoist and the manually operated counterweight hoist. The manually operated counterweight hoist includes a batten operable to support a load, an arbor operable to support one or more counterweights, a hand line operable to move the batten or the arbor, a brake operable to prevent movement of the arbor and the batten by constricting movement of the hand line, a brake actuator operable to activate the brake, a sensor that measures a speed of the arbor, and a controller including an electronic processor. The controller is operatively coupled to the sensor and the brake actuator, and the controller is configured to receive a measurement signal from the sensor. The system control device includes a second electronic processor and is configured to control operation of the motorized hoist, receive the measurement signal from the controller, determine whether the speed of the arbor exceeds a threshold based on the measurement signal, and instruct the controller to activate the brake actuator when the speed of the arbor exceeds the threshold.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
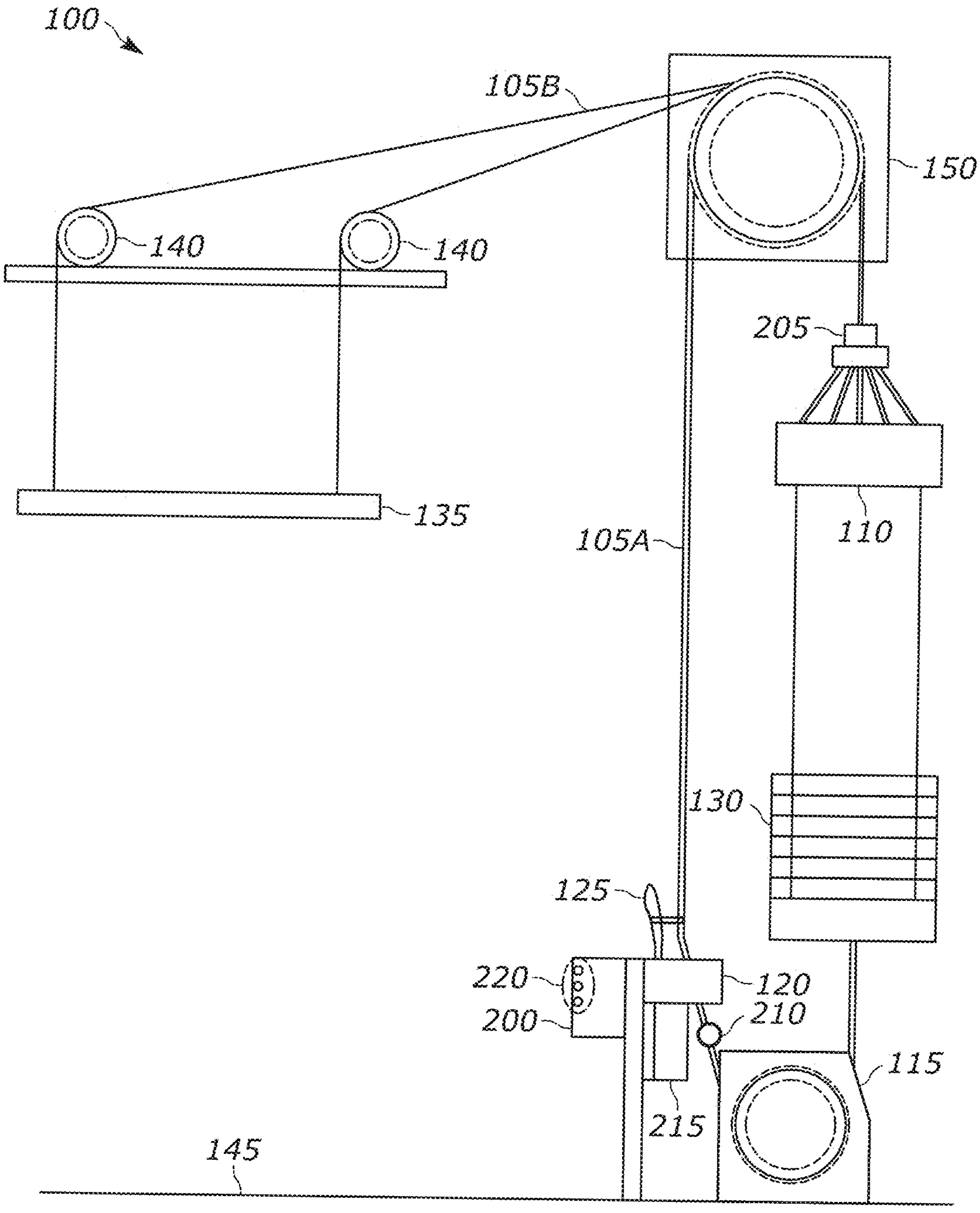
FIG. 1 illustrates a block diagram of a manually operated counterweight hoist according to some embodiments.

FIG. 1 illustrates a block diagram of a manually operated counterweight hoist 100 that may be included in a control digital rigging system. Hereinafter, the manually operated hoist 100 may also be referred to as the "manual hoist" 100. As shown, the manual hoist 100 includes a plurality of lines 105 that are used for operating the manual hoist 100. In some embodiments, the lines are implemented using ropes, such as nylon ropes or hemp ropes. In some embodiments, the lines 105 are implemented using cables, such as galvanized steel cables or stainless steel cables.

The plurality of lines 105 includes hand lines 105A that are manipulated by operators to adjust one or more components of the manual hoist 100. As shown, the hand lines 105A run from the bottom of an arbor 110 to a tension block 115. The manual hoist 100 further includes a rope lock, or brake, 120 through which the hand line 105A passes. The brake 120 is a device used to brake, or constrict, and release the hand line 105A when an operator raises and lowers a locking lever 125. An operator may raise the lock lever 125 of the brake 120 to prevent movement of the hand line 105A when loads connected to the manual hoist 100 are unbalanced. For example, an unbalanced load condition may occur while counterweights 130 are being added to or removed from the arbor 110. When loads connected to manual hoist 100 are balanced, a crew member may lower the lock lever 125 to release brake 120 and enable movement of hand line 105A. In some instances, a crew member activates brake 120, via lock lever 125, to prevent a runaway condition from causing damage to the arbor 110 and/or other components of manual hoist 100.

The plurality of lines 105 also includes lift lines 105B, which are used to support the loads, such as the loads supported by a batten 135, connected to manual hoist 100. As shown, the lift lines 105B run from the batten 135 up to loft blocks 140 of manual hoist 100. The lift lines 105B further extend across the stage 145 from the loft blocks 140 to a head block 150, and from the head block 150 down to arbor 110. The batten 135 supports a load, such as a backdrop or other stage props, and is raised and/or lowered by an operator using handlines 105A. In some embodiments, the plurality of lines 105 interconnect one or more additional components to manual hoist 100, such as locking rails, a loading bridge, drums, and other known components of a manually operated counterweight hoist.

The manual hoist 100 further includes additional components that provide the manual hoist 100 with improved features and capabilities to integrate the manual hoist 100 with a digital rigging control system. For example, the manual hoist 100 further includes a digital controller 200, one or more weight sensors, such as load cell 205, a position and/or speed sensor 210, an electronic actuator 215 for brake 120, and one or more cue lights 220. In some embodiments, the digital controller 200, the load cell 205, the position and/or speed sensor 210, the electronic actuator 215 for brake 120, and the cue lights 220 are installed during installation of the other above-described components of manual hoist 100. In other embodiments, the digital controller 200, the load cell 205, the speed sensor 210, the electronic actuator 215 for brake 120, and the cue lights 220 are installed after the above-described components of manual hoist 100 are installed. For example, a manual hoist installed in an existing theater that does not include adequate safety or digital control features may be retrofitted with one or more of the digital controller 200, the load cell 205, the speed sensor 210, the electronic actuator 215 for brake 120, and the cue lights 220.

Figure 2:
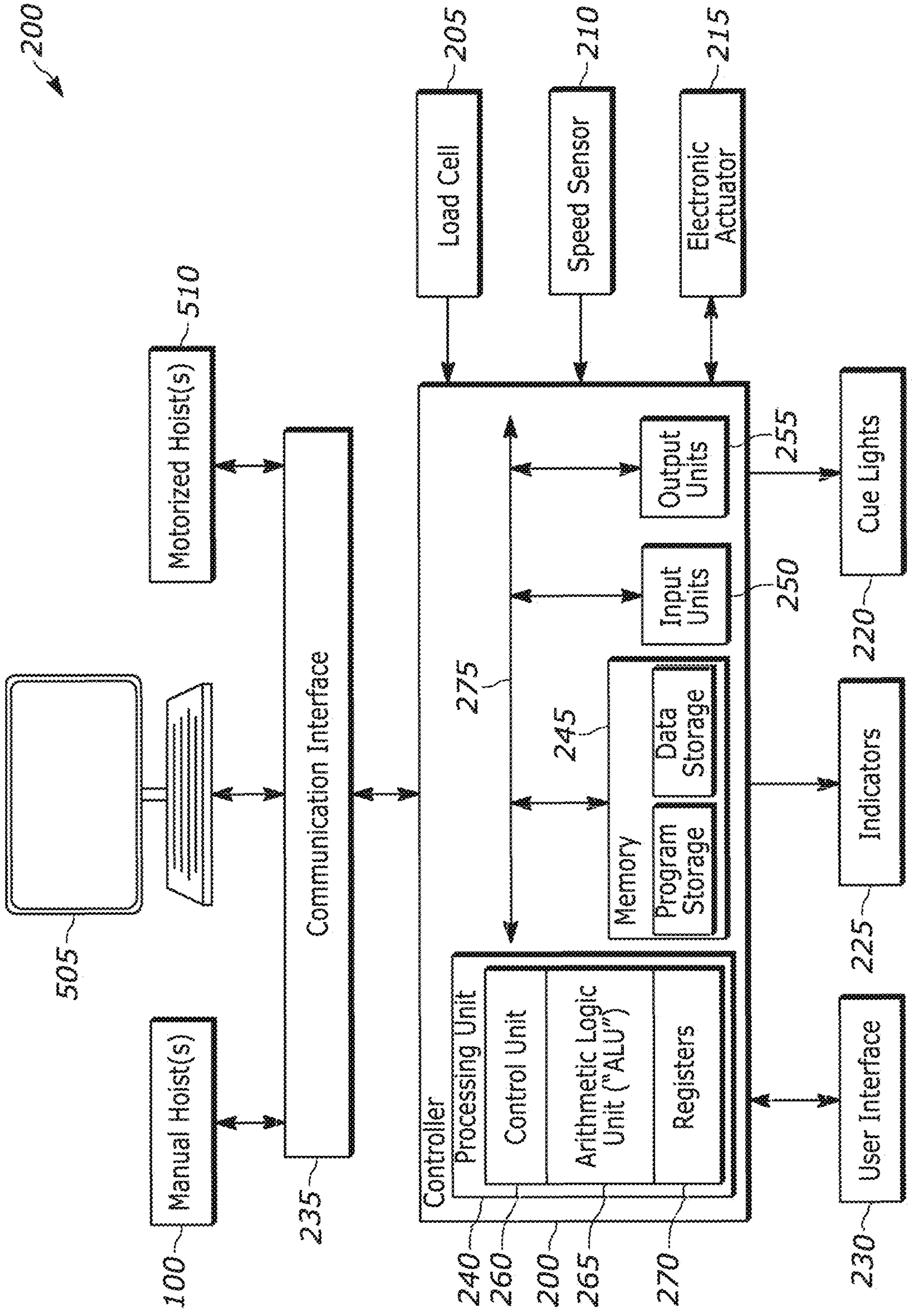
FIG. 2 illustrates a controller for the manually operated counterweight hoist of FIG. 1 according to some embodiments.

FIG. 2 illustrates a block diagram of the digital controller 200 included in manual hoist 100. The digital controller 200 is electrically and/or communicatively connected to a variety of components of the manual hoist 100. For example, the illustrated digital controller 200 is connected to the load cell 205, the speed sensor 210, the electronic actuator 215, and the cue lights 220. During operation of the manual hoist 100, the digital controller 200 is configured to receive signals from and/or transmit signals to the load cell 205, the speed sensor 210, the electronic actuator 215, and the cue lights 220. In some embodiments, the digital controller 200 is electrically and/or communicatively connected to a variety of additional modules and components, such as one or more indicators 225 (e.g., LEDs, a liquid crystal display ["LCD"], etc.), a user input or user interface 230, and a communications interface 235. In some embodiments, the indicators 225 and the user interface 230 are be integrated together in the form of, for instance, a touch-screen. In some embodiments, the cue lights 220 are integrated together with the indicators 225 and/or the user interface 230 in the form of, for instance, a display.

As will be described below, the digital controller 200 includes combinations of hardware and software that are operable to, among other things, control operation of components included in the manual hoist 100 and integrate the manual hoist 100 with a digital rigging control system 500 (see FIG. 5). Furthermore, the digital controller 200 includes a plurality of electrical and electronic components that provide power, operational control, and protection to the components and modules within the controller 200 and/or the manual hoist 100. For example, the controller 200 includes, among other things, a processing unit 240 (e.g., a microprocessor, a microcontroller, an electronic processor, an electronic controller, or another suitable programmable device), a memory 245, input units 250, and output units 255. The processing unit 240 includes, among other things, a control unit 260, an arithmetic logic unit ("ALU") 265, and a plurality of registers 270 (shown as a group of registers in FIG. 2), and is implemented using a known computer architecture (e.g., a modified Harvard architecture, a von Neumann architecture, etc.). The processing unit 240, the memory 245, the input units 250, and the output units 255, as well as the various modules or circuits connected to the controller 200 are connected by one or more control and/or data buses (e.g., common bus 275). The control and/or data buses are shown generally in FIG. 2 for illustrative purposes. The use of one or more control and/or data buses for the interconnection between and communication among the various modules, circuits, and components would be known to a person skilled in the art in view of the embodiments described herein.

The memory 245 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 240 is connected to the memory 245 and executes software instructions that are capable of being stored in a RAM of the memory 245 (e.g., during execution), a ROM of the memory 245 (e.g., on a generally permanent basis), or another non-transitory computer readable medium such as another memory or a disc. Software included in the implementation of the digital rigging control system 500 (FIG. 5) and digital controller 200 can be stored in the memory 245 of the digital controller 200. The software includes, for example, firmware, one or more applications, program data, filters, rules, one or more program modules, and other executable instructions. The digital controller 200 is configured to retrieve from the memory 245 and execute, among other things, instructions related to the control processes and methods described herein. In other embodiments, the digital controller 200 includes additional, fewer, or different components.

The user interface 230 is included to provide user control of one or more components of the manual hoist 100. The user interface 230 is operably coupled to the digital controller 200 to control, for example, drive signals provided to the electronic brake actuator 215. The user interface 230 can include any combination of digital and analog input devices required to achieve a desired level of control for the system 100. For example, the user interface 230 can include a display and input devices, a touch-screen display, a plurality of knobs, dials, switches, buttons, faders, or the like. In the embodiment illustrated in FIG. 2, the cue lights 220 are separate from the user interface 230. In other embodiments, the cue lights 220 are included in the user interface 230.

With reference to FIG. 1, the digital controller 200 is shown as being located near the locking lever 125 of manual hoist 100. When the digital controller 200 is mounted at this location, an operator of the locking lever 125 can also operate, or interact with, the digital controller 200 without having to move too far. However, it should be understood that the location of the digital controller 200 shown in FIG. 1 is provided merely as an example and does not limit the digital controller 200 from being positioned in other locations near the manual hoist 100. As described above, in some instances, the digital controller 200 is installed when the other components of the manual hoist 100 are installed in a theater or performance space. However, in other instances, the digital controller 200 is installed on preexisting manual hoists 100 that did not previously include any digital control features.

As also shown in FIG. 1, the load cell 205 is installed on the line 105 that supports arbor 110. Thus, the load cell 205 senses, or measures, the load weight of the arbor 110. However, it should be understood that the load cell 205 may be installed at other locations along manual hoist 100. For example, in some embodiments, the load cell 205 is installed on one or more of the lift lines 105B that support batten 135. In such embodiments, the load cell 205 measures, or senses, the weight of the load supported by batten 135. In some embodiments, one or more additional load cells are installed on the manual hoist 100. For example, in some embodiments, a first load cell 205 is installed on the line 105 that supports arbor 110 and a second load cell 205 is installed on a lift line 105B that supports batten 135. As another example, in some embodiments, an additional load cell 205 is installed on hand line 105A near the brake 120.

As described above, in some instances, the one or more load cells 205 are installed when the other components of the manual hoist 100 are installed in a theater or performance space. However, in other instances, the one or more load cells 205 are installed on preexisting manual hoists 100 that did not previously include any digital control features.

Weight measurements taken by the load cell 205 are periodically, or continuously, transmitted to the digital controller 200 for processing. The digital controller 200 is configured to determine a load on the manual hoist 100 based on the measurement signals received from load cell 205. For example, the digital controller 200 may be configured to determine a total weight of the counterweights 130 added to arbor 110, a weight of the load supported by batten 135, and/or a total load on the manual hoist 100 based on the measurements taken by the one or more load cells 205. In some embodiments, the digital controller 200 is further configured to display the determined load on manual hoist 100 using the cue lights 220, the indicators 225, and/or user-interface 230. In some embodiments, the digital controller 200 activates the indicators 225 when the determined load on manual hoist 100 exceeds an overload threshold. In some embodiments, the digital controller 200 logs, or stores, the determined load on manual hoist 100 in memory 245. In embodiments in which a first load cell 205 measures the load weight of arbor 110 and a second load cell 205 measures the weight of the load supported by batten 135, the digital controller 200 is configured to determine whether the two loads are balanced based on weight measurements received from the first and second load cells 205. In such embodiments, the digital controller 200 is further configured to display an unbalanced load condition using the cue lights 220, the indicators 225, and/or user-interface 230 when the digital controller 200 determines that the difference between the arbor 110 load weight and the load weight supported by batten 135 exceeds a balance threshold (e.g., a 1% difference).

The manual hoist 100 further includes the position and/or speed sensor 210. The position and/or speed sensor 210 is configured to measure the position and movement, or speed, of one or more lines 105 of the manual hoist 100. In some embodiments, the position and/or speed sensor 210 is implemented as a quadrature encoder on a friction wheel through which line 105 passes. In some embodiments, other types of position and/or speed sensors are used.

As shown in FIG. 1, the position and/or speed sensor 210 is installed on the hand line 105A that is connected to the bottom of arbor 110. Thus, the speed sensor 210 of the illustrated embodiment is configured to measure the position and/or speed of the arbor 110. However, it should be understood that the position and/or speed sensor 210 may be installed at other locations along the lines 105 of manual hoist 100. For example, in some embodiments, the position and/or speed sensor 210 is installed on the line 105 attached to the top of arbor 110 (e.g., near the load cell 205). In other embodiments, the position and/or speed sensor 210 is installed on one or more of the lift lines 105B that support batten 135. Furthermore, as described above, in some instances, the position and/or speed sensor 210 is installed when the other components of the manual hoist 100 are installed in a theater or performance space. However, in other instances, the position and/or speed sensor 210 is installed on a preexisting manual hoist that did not previously include any digital control features.

In operation, the position and/or speed sensor 210 periodically, or continuously, transmits the position and/or speed measurements to digital controller 200. In some embodiments, the position and/or speed sensor 210 transmits a measured position of the arbor 110 to the digital controller 200, which may be configured to determine and display the position of arbor 110 to an operator using one or more of the cue lights 220, the indicators 225, and/or the user-interface 230. For example, the digital controller 200 may be configured to determine that arbor 110 is in a raised position based on a measurement signal received from the position and/or speed sensor 210. Accordingly, the digital controller 200 may be further configured to display the raised position of arbor 110 to an operator. As another example, the digital controller 200 may be configured to determine that arbor 110 is in a lowered position based on a measurement signal received from the position and/or speed sensor 210. Accordingly, the digital controller 200 may be further configured to display the lowered position of arbor 110 to an operator.

In operation, the position and/or speed sensor 210 is further configured to periodically, or continuously, transmit a measured speed of the arbor 110 to the digital controller 200. In other embodiments, the position and/or speed sensor 210 is additionally configured to transmit a measured speed of the load supported by batten 135 to the digital controller 210. The digital controller 200 is configured to determine the speed of the arbor 110 and/or the load supported by batten 135 based on the speed measurements received from the position and/or speed sensor 210. In some embodiments, the digital controller 200 is further configured to perform one or more actions based on the determined speed of arbor 110 and/or the load supported by batten 135. For example, the digital controller 200 is configured to activate the electronic brake actuator 215 when the determined speed of the arbor 110 and/or the load exceeds an overspeed threshold. That is, during a runaway condition in which components of the manual hoist 100 move at unsafe speeds, the digital controller 200 is configured to detect the unsafe condition and automatically activate the electronic brake actuator 215 without intervention from an operator. In some embodiments, the digital controller 200 is further configured to activate one or more of the cue lights 220, the indicators 225, and/or components of user-interface 230 to alert an operator of the runaway condition when the determined speed exceeds the overspeed threshold. In some embodiments, the digital controller 200 is configured to display the determined speed of arbor 110 and/or the load to an operator using one or more of cue lights 220, the indicators 225, and/or the user-interface 230 even when the determine speed does not exceed the overspeed threshold.

As described above, the digital controller 200 is configured to activate the electronic brake actuator 215 when the digital controller 200 determines that the speed of the arbor 110 and/or the load supported by batten 135 exceeds an overspeed threshold. Activation of the electronic brake actuator 215 causes the brake 120 to stop line 105 without intervention from an operator. That is, when activated, the electronic brake actuator 215 automatically closes the brake 120 to brake, or constrict, movement of the line 105 without an operator having to operate lock lever 125. Thus, the digital controller 200 is configured to automatically stop movement of the arbor 110 during a runaway condition by activating the electronic brake actuator 215.

In some embodiments, the electronic brake actuator 215 is a cam-actuated device that is controlled by digital controller 200. In other embodiments, the electronic brake actuator 215 is implemented using other types of automatic actuators or motors. In some embodiments, the electronic brake actuator 215 is connected directly to the brake 120. In other embodiments, the electronic brake actuator 215 is connected to the lock lever 125, and thus, is configured to operate the lock lever 125 in response to an activation signal received from the digital controller 200. In such embodiments, the digital controller 200 controls electronic brake actuator 215 to raise lock lever 125 to prevent movement of the line 105, and thus, movement of the arbor 110 during a runaway condition. Furthermore, in such embodiments, the digital controller 200 controls electronic brake actuator 215 to lower lock lever 125 to enable movement of the line 105, and thus, movement of the arbor 110 when the runaway away condition is resolved.

Figure 3:
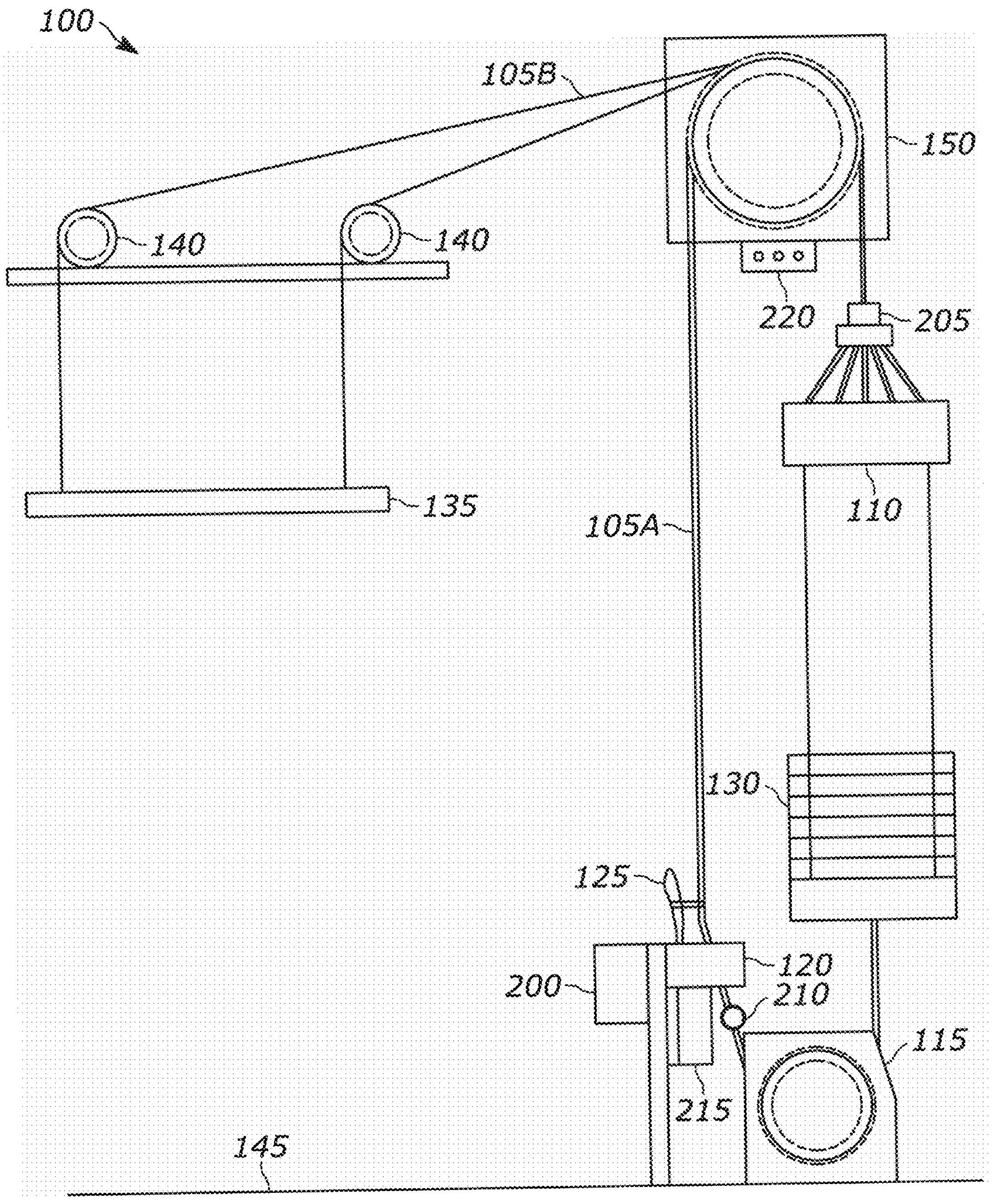
FIG. 3 illustrates a block diagram of a manually operated counterweight hoist according to some embodiments.

The manual hoist 100 further includes one or more cue lights 220. In some embodiments, the one or more cue lights 220 are implemented as one or more light emitting diodes (LEDs). In other embodiments, other types of lights are used to implement the cue lights 220. In some embodiments, as described above, the cue lights 220 are integrated with the indicators 225 and/or the user-interface 230 of digital controller 200. For example, as shown in FIG. 1, the cue lights 220 may be supported by a housing of the digital controller 200. In other embodiments, the cue lights 220 are separate from the indicators 225 and/or user-interface of the digital controller 200. For example, as shown in FIG. 3, the cue lights 220 may alternatively be mounted in an overhead location that is easily visible to an operator.

The digital controller 200 is configured to illuminate one or more of the cue lights 220 when it is time for an operator to move the manual hoist 100. For example, when the manual hoist 100 is included in a digital rigging system including many other hoists, the digital cue lights 220 of the manual hoist 100 are illuminated to indicate to an operator that the manual hoist 100 should be moved. In some embodiments, the cue lights 220 are illuminated in a first color (e.g., green) when the manual hoist 100 should be moved by an operator. That is, when it is time for an operator to raise and/or lower the manual hoist 100, the digital controller 200 may be configured to illuminate a green LED included in cue lights 220. Similarly, in some embodiments, the cue lights 220 are illuminated in a different color (e.g., red) when the manual hoist 100 should not be moved and/or is in a runaway condition. For example, if a runaway condition occurred and the electronic brake actuator 215 was activated, the digital controller 200 may be configured to illuminate a red LED included in the cue lights 220. In some embodiments, the cue lights 220 are illuminated in a third color (e.g., yellow) when no action is to be taken with the manual hoist. For example, when the manual hoist 100 is in a standby mode, the digital controller 200 may be configured to illuminate a yellow LED included in the cue lights 220.

In some embodiments, the digital controller 200 is configured to illuminate the cue lights 220 in accordance with a first illumination pattern when the manual hoist 100 should be moved by an operator. For example, the digital controller 200 may be configured to blink one or more of the cue lights 220 at a first rate and/or for a first amount of time when the manual hoist 100 should be moved by an operator. Similarly, in some embodiments, the cue lights 220 are illuminated in accordance with a second illumination pattern when the manual hoist 100 should not be moved and/or is in a runaway condition. For example, if a runaway condition occurred and the electronic brake actuator 215 was activated, the digital controller 200 may be configured to blink one or more of the cue lights 220 at a second rate and/or for a second amount of time. In some embodiments, the cue lights 220 are illuminated in accordance with a third illumination pattern when no action is to be taken with the manual hoist. For example, when the manual hoist 100 is in a standby mode, the digital controller 200 may be configured to illuminate one or more cue lights 220 in a steady pattern.

Figure 4:
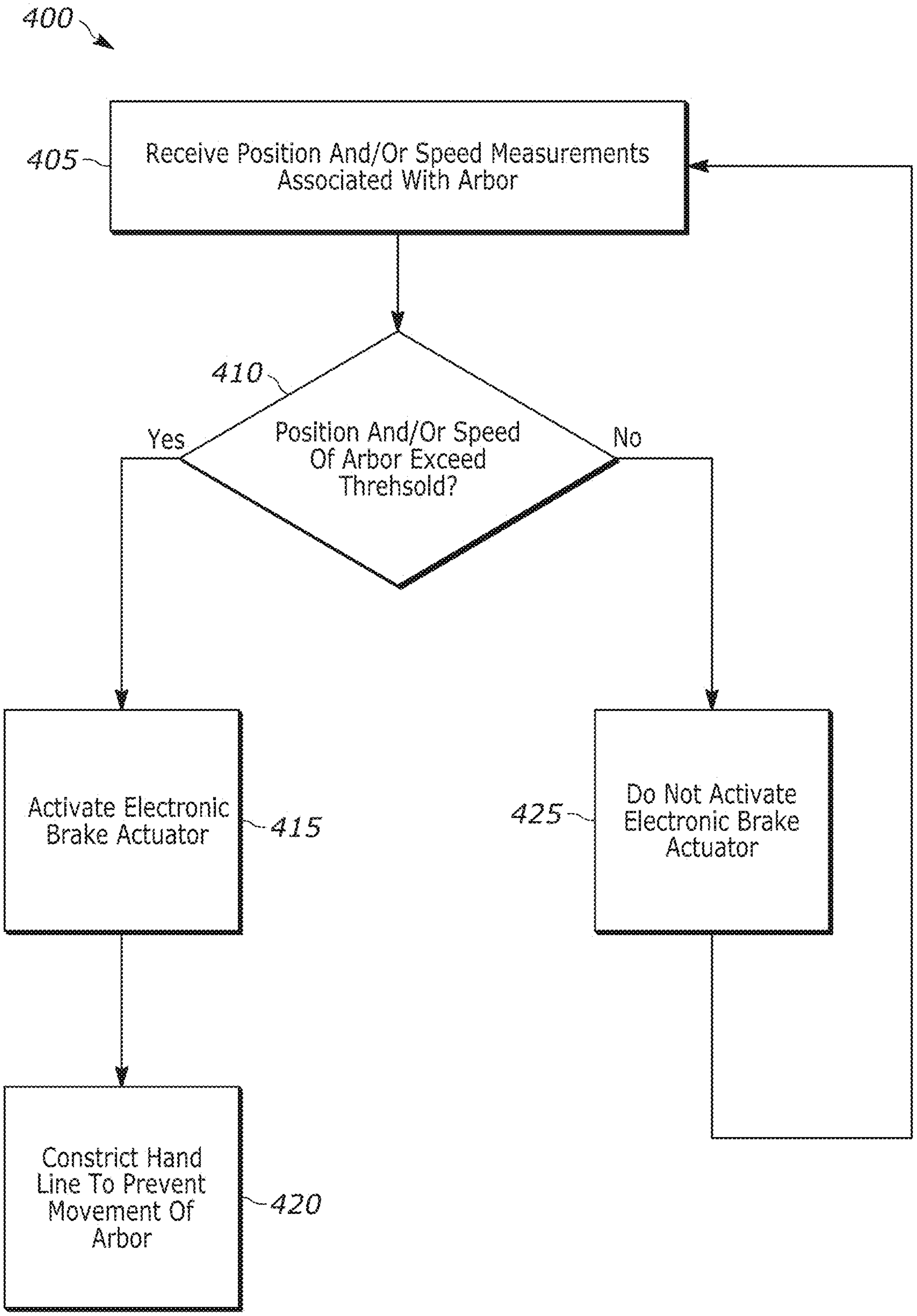
FIG. 4 illustrates a method of operating the manually operated counterweight hoists of FIGS. 1 and 3 according to some embodiments.

FIG. 4 is a flowchart illustrating a process, or method, 400 for operating the manual hoist 100. It should be understood that the order of the steps disclosed in method 400 could vary. Furthermore, additional steps may be added to the method 400. In some embodiments, method 400 is performed by the digital controller 200 of the manual hoist 100. In other embodiments, method 400 is performed by a digital rigging control system, as will be described in more detail below.

The method 400 includes receiving a position and/or speed measurement of the arbor 110 from the position and/or speed sensor 210 (block 405). As described above, the digital controller 200 is configured to continuously, or periodically, receive position and/or speed measurements from the position and/or speed sensor 210. The method further includes determining, by the digital controller 200, whether a current speed and/or position of the arbor 110 exceeds a threshold (e.g., an overspeed threshold) (block 410).

The method 400 further includes activating, by the digital controller 200, the electronic brake actuator 215 when the determined position and/or speed of the arbor 110 exceeds the threshold (block 415). As described above, activation of the electronic brake actuator 215 causes the brake 120 to brake, or stop, movement of the hand line 105A to which the arbor 110 and/or the batten 135 is connected (block 420). Thus, in response to activation of the brake actuator 215, the brake 120 constricts movement of the line 105 connected to the arbor 110 and/or batten 135 when the position and/or speed of arbor 110 exceeds an overspeed threshold (e.g., during a runaway condition in which the load supported by batten 135 and the load on arbor 110 are unbalanced). When the position and/or speed of the arbor 110 does not exceed the overspeed threshold, the digital controller 200 does not activate electronic brake actuator 215 and the method returns to block 405 (block 425).

In some embodiments, the manual hoist 100 is included in a digital rigging control system that includes one or more motorized hoists. In such embodiments, the digital controller 200 is configured to interface, or electrically connect, the manual hoist 100 to one or more control devices included in the digital rigging control system. Moreover, in such embodiments, the digital controller 200 and/or other components of the manual hoist 100 are controlled by the digital rigging system.

Figure 5:
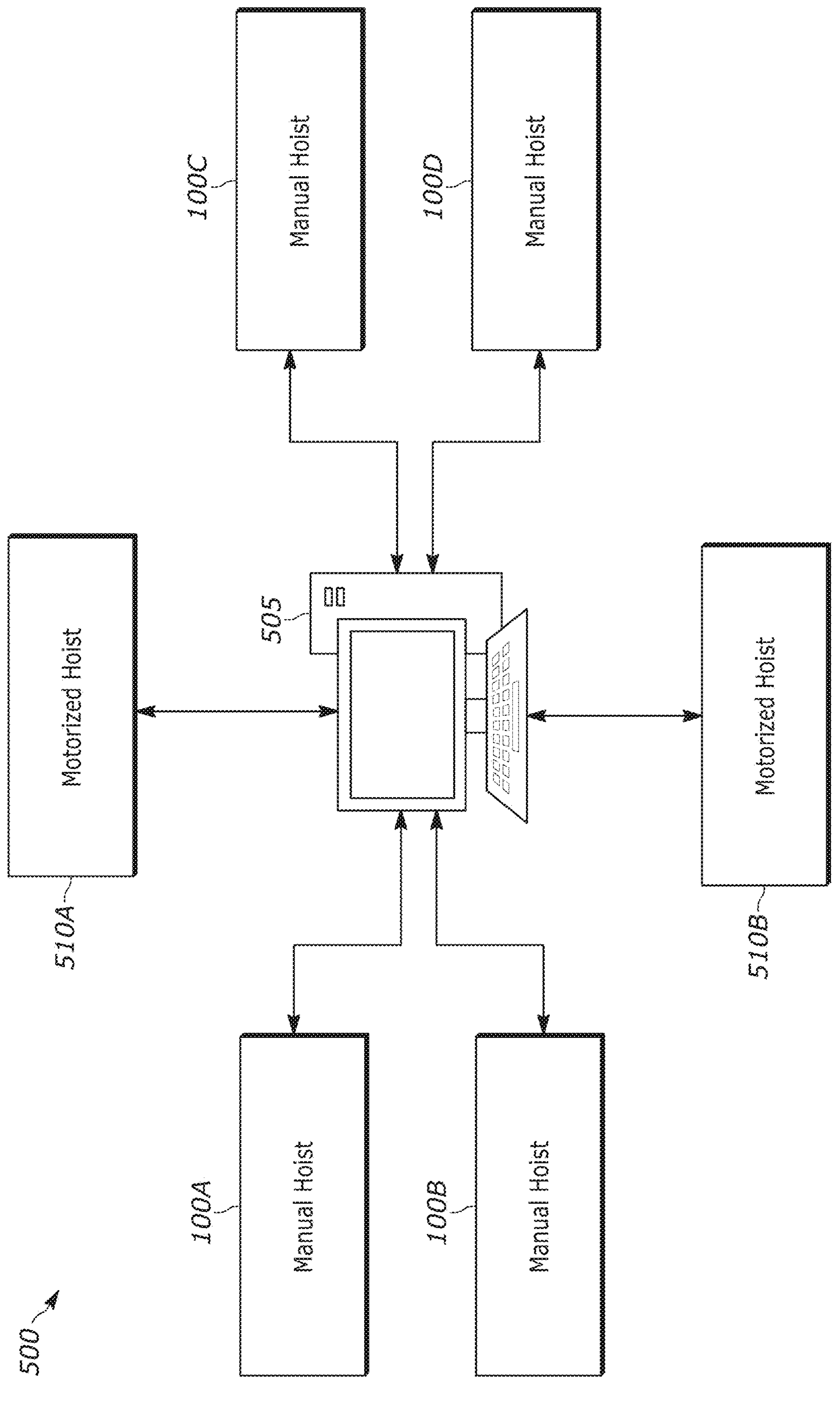
FIG. 5 illustrates a block diagram of a digital rigging control system according to some embodiments.

FIG. 5 illustrates a block diagram of a digital rigging control system 500 that may be installed at a theater or performance space. As shown, the system 500 includes a plurality of manual hoists 100A-100D, a system control device 505, and a plurality of motorized hoists 510A-510B. Persons skilled in the art will appreciate that the numbers of manual hoists 100A-100D and motorized hoists 510A-510B illustrated in FIG. 5 are provided merely as an example and do not limit the construction of system 500. Moreover, it should be understood that in some embodiments, system 500 includes more hoists or less hoists than the illustrated number of manual hoists 100 and motorized hoists 510. For example, in some embodiments, system 500 includes more than four manual hoists 100 and/or more than two motorized hoists 510. Similarly, in some embodiments, the system 500 includes less than four manual hoists 100 and/or less than two motorized hoists 510. In some embodiments, the system 500 includes many more (e.g., ten more, twenty more, thirty more, etc.) manual hoists 100 than motorized hoists 510. In some embodiments, the system 500 includes one or more manual hoists 100 and the control device 505, but the system 500 does not include any motorized hoists 510.

As shown in FIG. 5, the manual hoists 100A-100D and the motorized hoists 510A-510B are in electrical communication with the system control device 505. In particular, an individual manual hoist 100 is electrically, or communicatively, connected to the system control device 505 by the digital controller 200 included in the manual hoist 100. For example, as described above, the digital controller 200 includes a communication interface 235 that is configured to provide communication between the digital controller 200 and the system control device 505. In some embodiments, the communication interface 235 of a digital controller 200 provides wired communication between a manual hoist 100 and the system control device 505. In some embodiments, the communication interface 235 of a digital controller 200 provides wireless communication between a manual hoist 100 and the system control device 505. In some embodiments, the digital controller 200 of a particular manual hoist 100 is configured to communicate, via the communication interface 235, with one or more other manual hoists 100 and/or motorized hoists 510.

As shown, the motorized hoists 510A-510B are also electrically connected to and configured to communicate with the system control device 505. In particular, the motorized hoists 510A-510B include respective controllers having electronic processors and communication interfaces configured to communicate with the system control device 505. In some embodiments, the motorized hoists 510A-510B are further configured to communicate with each other and/or the manual hoists 100A-100D included in system 500. Operation of the motorized hoists 510A-510B is controlled by the system control device 505.

The system control device 505 may be implemented as a computing device that includes an electronic processor and a memory. In some embodiments, the system control device 505 may be, for example, a personal or desktop computer, a laptop computer, a tablet computer, a server, a control terminal, or a mobile phone (e.g., a smart phone). In some embodiments, the system control device 505 is implemented as a plurality, or combination, of the computing devices described above.

During operation of the digital rigging control system 500, the system control device 505 is configured to communicate with and control one or more of the manual hoists 100A-100D and the motorized hoists 510A-510B. In some embodiments, the system control device 505 is configured to perform one or more of the control actions described above with respect to the digital controller 200 of manual hoist 100. In such embodiments, the digital controller 200 may be configured to provide communication between the one or more above-described components of manual hoist 100 and the system control device 505. That is, the digital controller 200 may be configured to transmit, or forward, one or more measurement signals received from the components of manual hoist 100 to the system control device 505. Similarly, the digital controller may be further configured to transmit, or forward, one or more control signals from the system control device 505 to the one or more components of manual hoist 100.

For example, in some embodiments, the digital controller 200 is configured to transmit, or forward, load weight measurements received from load cell(s) 205 to the system control device 505. In such embodiments, the system control device 505 is configured to determine the load on the manual hoist 100 based on the measurement signals received from digital controller 200. For example, the system control device 505 may be configured to determine a total weight of the counterweights 130 added to arbor 110, a weight of the load supported by batten 135, and/or a total load on the manual hoist 100 based on the measurements taken by load cell(s) 205. After determining the load on manual hoist 100, the system control device 505 is configured to transmit a signal including the determined load to the digital controller 200. In some embodiments, the system control device 505 stores the determined load in a memory external to digital controller 200 (e.g., a memory of the system control device 505 or a server).

In some embodiments, the system control device 505 is further configured to instruct digital controller 200 to display the determined load on the cue lights 220, the indicators 225, and/or the user-interface 230, as described above. For example, the system control device 505 may be configured to instruct digital controller 200 to display the determine load and/or activate one or more indicators 225 when the determined load on manual hoist 100 exceeds an overload threshold. As another example, the system control device 505 may be further configured to instruct digital controller 200 to display an unbalanced load condition when the system control device 505 determines that the difference between the arbor 110 load weight and the load weight supported by batten 135 exceeds a balance threshold (e.g., a 1% difference). In other embodiments, the digital controller 200 determines whether to display any information associated with the load on manual hoist 100 based on the determined load that is received from the system control device 505.

Similarly, the digital controller 200 is configured to transmit, or forward, position and/or speed measurements received from the position and/or speed sensor 210 to the system control device 505. Furthermore, the system control device 505 is configured to determine the position and/or speed of arbor 110 based on the measurements received from digital controller 200. For example, the system control device 505 may be configured to determine whether the arbor 110 is in a raised or lowered position and transmit the determined position of the arbor 110 back to digital controller 200. In some embodiments, the system control device 505 is further configured to instruct the digital controller 200 to display, using the cue lights 220, indicators 225, and/or user-interface 230, the determined position of arbor 110.

In some embodiments, the system control device 505 is configured to determine the speed of arbor 110 and/or the load supported by batten 135 based on the measurements received from the digital controller 200. In such embodiments, the system control device 505 is further configured to determine whether the speed of the arbor 110 and/or the load supported by batten 135 exceeds an overspeed threshold. When the speed of the of the arbor 110 and/or load supported by batten 135 does exceed the overspeed threshold, the system control device 505 is configured to transmit a control signal that instructs digital controller 200 to activate the electronic brake actuator 215. That is, the system control device 505 is configured to determine whether the arbor 110 and/or load supported by batten 135 is in a runaway condition based on measurement signals received from the digital controller 200. When the system control device 505 determines a runaway condition is occurring, the system control device 505 activates, by the digital controller 200, the electronic brake actuator 215 to prevent movement of the arbor 110. In some embodiments, the system control device 505 is further configured to instruct the digital controller 200 to display the runaway condition using the cue lights 220, the one or more indicators 225, and/or the user-interface 230.

Furthermore, in some embodiments, the system control device 505 is configured to instruct the digital controller 200 to illuminate one or more of the cue lights 220. In some embodiments, the system control device 505 is configured to execute a cue program for controlling operation of the manual hoists 100A-100D and motorized hoists 510A-510B included in the digital rigging control system 500. In such embodiments, the system control device 505 is configured to transmit a signal that instructs digital controller 200 to illuminate the cue lights 220 in accordance with a first pattern when it is time for an operator to move the particular manual hoist 100. For example, as described above, the system control device 505 may be configured to instruct the digital controller 200 to illuminate the cue lights 220 in a particular color (e.g., green) and/or in a first blinking sequence to alert an operator that it is time to raise or lower the manual hoist 100. Similarly, in such embodiments, the system control device 505 is configured to instruct digital controller 200 to illuminate the cue lights 220 in accordance with a second color (e.g., red) and/or a second blinking sequence when the system control device 505 determines a runaway condition is present. In some embodiments, the system control device 505 is further configured to instruct digital controller 200 to illuminate the cue lights 220 in accordance with a third color (e.g., yellow) and/or a third blinking sequence when the manual hoist 100 is in a standby mode.

Figure 6:
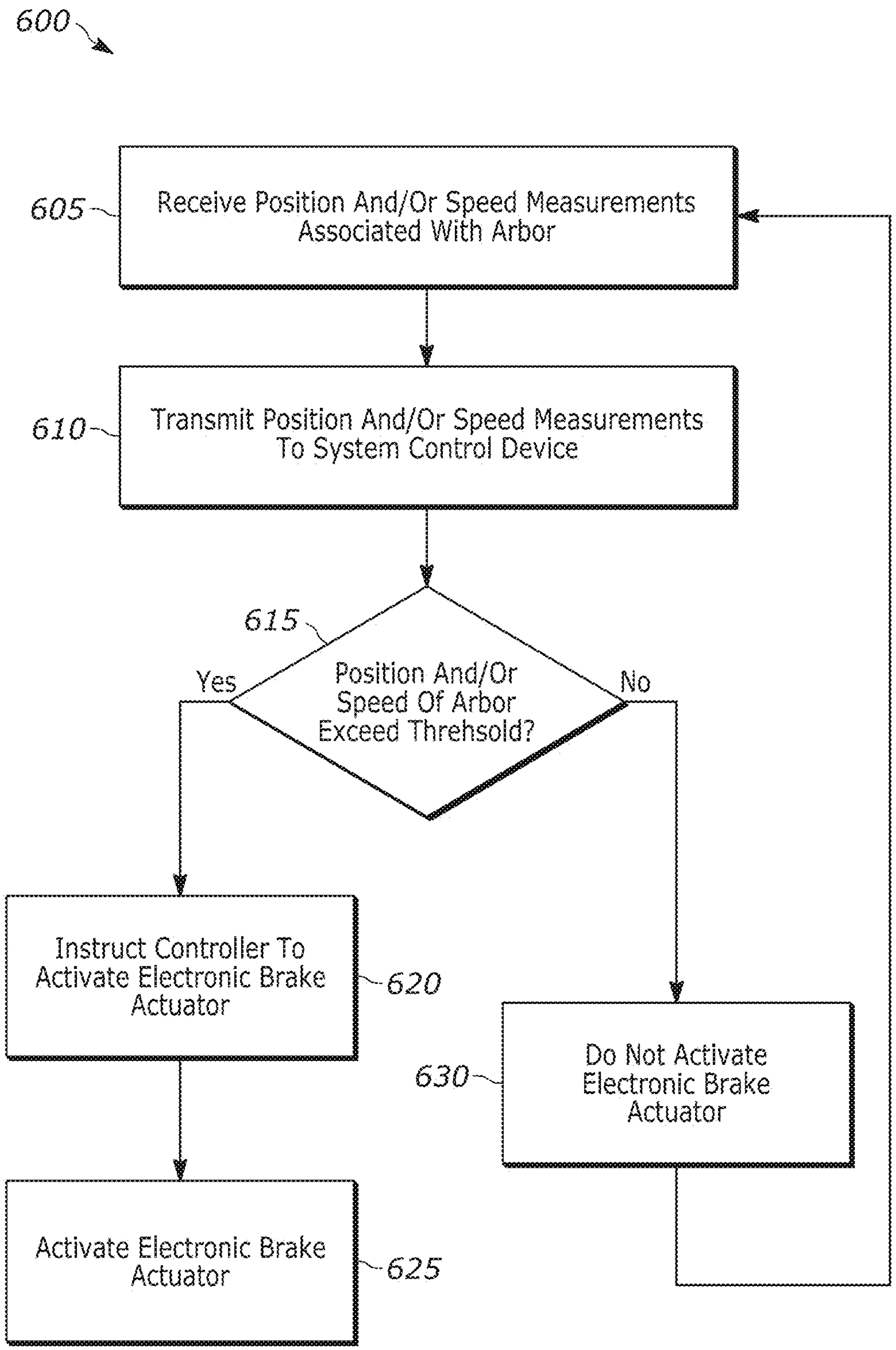
FIG. 6 illustrates a method of operating the digital rigging control system of FIG. 5 according to some embodiments.

FIG. 6 is a flowchart illustrating a process, or method, 600 for operating a digital rigging control system 500. It should be understood that the order of the steps disclosed in method 600 could vary. Furthermore, additional steps may be added to the method 600. In some embodiments, method 600 is performed by the system control device 505. In some embodiments, the method 600 is performed by the digital controller 200 of the manual hoist 100. In other embodiments, method 600 is performed by a combination of the system control device 505 and one or more digital controllers 200.

The method 600 includes receiving a position and/or speed measurement of the arbor 110 from the position and/or speed sensor 210 (block 605). As described above, the digital controller 200 is configured to continuously, or periodically, receive position and/or speed measurements from the position and/or speed sensor 210. At block 610, the method further includes transmitting the received position and/or speed measurements to the system control device 505 (block 610).

The method 600 further includes determining, by the system control device 505, whether a current speed and/or position of the arbor 110 exceeds a threshold (block 615) and instructing, by the system control device 505, the digital controller 200 to activate the electronic brake actuator 215 when the determined position and/or speed of the arbor 110 exceeds the threshold (block 620). As described above, activation of the electronic brake actuator 215 causes the brake 120 to brake, or stop, movement of the line 105 to which arbor 110 is connected. Thus, at block 620, the system control device 505 instructs the digital controller 200 to activate the electronic brake actuator 215 to stop movement of the arbor 110 when the position and/or speed of arbor 110 exceeds an overspeed threshold (e.g., during a runaway condition in which the load supported by batten 135 and the load on arbor 110 are unbalanced). The method 600 further includes activating, by the digital controller 200, the electronic brake actuator 215 in response to receiving an instruction from the system control device 505 (block 625). Accordingly, activating the electronic brake actuator 215 includes constricting, by the electronic brake actuator 215, movement of the hand line 105A, and thus, movement of the arbor 110 and/or batten 135. When the position and/or speed of the arbor 110 does not exceed the overspeed threshold, the system control device 505 does not instruct digital controller 200 to activate the electronic brake actuator 215 and the method returns to block 605 (block 630).

Thus, embodiments described herein provide, among other things, systems and methods for digital control of a manually operated counterweight hoist. Various features and advantages are set forth in the following claims.

What is claimed is:

1. A manually operated counterweight hoist comprising:
a batten operable to support a load;
an arbor connected to the batten by at least one lift line and operable to support one or more counterweights;
a hand line coupled to the arbor and manually operable to move the batten to a raised position and to move the arbor to a raised position;
a brake operable to prevent movement of the arbor and the batten by constricting movement of the hand line;
a brake actuator operable to activate the brake;
a sensor configured to sense a movement associated with a speed of the arbor; and
a controller including an electronic processor, the controller operatively coupled to the sensor and the brake actuator, the controller configured to:
receive a measurement signal associated with the movement from the sensor;
determine whether the speed of the arbor exceeds a threshold based on the measurement signal; and
activate the brake actuator when the speed of the arbor exceeds the threshold.

2. The manually operated counterweight hoist of claim 1, further comprising a load cell configured to measure a weight of the arbor or the batten.

3. The manually operated counterweight hoist of claim 2, wherein the controller is further configured to:
receive additional measurement signals from the load cell; and
determine the weight of the arbor based and the weight of the batten based on the additional measurement signal; and
determine an unbalanced load condition when the weight of the arbor is unbalanced with the weight of the batten.

4. The manually operated counterweight hoist of claim 3, further comprising one or more visual indicators;
wherein the controller is further configured to display, using the one or more visual indicators, the weight of the arbor, the weight of the batten, and the unbalanced load condition.

5. The manually operated counterweight hoist of claim 1, further comprising one or more visual indicators.

6. The manually operated counterweight hoist of claim 5, wherein the controller is further configured to activate the one or more visual indicators when the speed of the arbor exceeds the threshold.

7. The manually operated counterweight hoist of claim 5, wherein the controller is further configured to activate the one or more visual indicators when it is time for an operator to move the manually operated counterweight hoist.

8. The manually operated counterweight hoist of claim 1, wherein the controller is further configured to transmit the measurement signal to an external control device; and
wherein the external control device is configured to determine the speed of the arbor based on the measurement signal.

9. A method of operating a manually operated counterweight hoist that includes an arbor and a hand line manually operable to move the arbor, the method comprising:
sensing, with a sensor, a movement of the arbor;
receiving, by a controller, a measurement signal associated with the movement from the sensor;
determining, by the controller, whether a speed of the arbor exceeds a threshold based on the measurement signal;
activating, by the controller, an electronic brake actuator for a brake when the speed of the arbor exceeds the threshold; and
constricting, by the brake, the hand line in response to activating the brake actuator.

10. The method of claim 9, further comprising receiving, by the controller, a second measurement signal from a load sensor; and
determining, by the controller, a weight of the arbor based on the second measurement signal.

11. The method of claim 10, displaying, by one or more visual indicators of the manually operated counterweight hoist, the weight of the arbor.

12. The method of claim 9, further comprising activating, by the controller, one or more visual indicators of the manually operated counterweight hoist when the speed of the arbor exceeds the threshold.

13. The method of claim 9, further comprising activating, by the controller, one or more visual indicators of the manually operated counterweight hoist when it is time for an operator to move the manually operated counterweight hoist.

14. The method of claim 9, further comprising transmitting, by the controller, the measurement signal to an external control device; and
determining, by the external control device, the speed of the arbor based on the measurement signal.

15. The method of claim 9, wherein sensing the movement of the arbor comprises sensing movement of the hand line.

16. A rigging control system comprising:

a manually operated counterweight hoist including:

a batten operable to support a load;

an arbor connected to the batten by at least one lift line and operable to support one or more counterweights;

a hand line coupled to the arbor and manually operable to move the batten or the arbor;

a brake operable to prevent movement of the arbor and the batten by constricting movement of the hand line;

a brake actuator operable to activate the brake;

a sensor configured to sense a movement associated with a speed of the arbor; and a controller including an electronic processor, the controller operatively coupled to the sensor and the brake actuator, the controller configured to receive a measurement signal from the sensor; and a system control device including a second electronic processor, the system control device operatively coupled to the controller of the manually operated counterweight hoist, the system control device configured to:

receive the measurement signal from the controller;

determine whether the speed of the arbor exceeds a threshold based on the measurement signal; and instruct the controller to activate the brake actuator when the speed of the arbor exceeds the threshold.

17. The rigging control system of claim 16, wherein the controller is further configured to activate the brake actuator in response to an instruction received from the system control device.

18. The rigging control system of claim 16, wherein the manually operated counterweight hoist further includes a load cell configured to measure a weight of the arbor and a weight of the batten;

wherein the controller is further configured to receive additional measurement signals from the load cell and transmit the additional measurement signals to the system control device; and wherein the system control device is further configured to determine an unbalanced load condition when the weight of the arbor is unbalanced with the weight of the batten and transmit the unbalanced condition to the controller.

19. The rigging control system of claim 18, wherein the manually operated counterweight hoist further includes one or more visual indicators; and wherein the controller is further configured to display, using the one or more visual indicators, the weight of the arbor and/or the weight of the batten; and wherein the controller is further configured to activate the one or more visual indicators when the unbalanced condition exists.

20. The rigging control system of claim 16, wherein the manually operated counterweight hoist further includes one or more visual indicators; and wherein the controller is further configured to activate the one or more visual indicators when the speed of the arbor exceeds the threshold.

21. The rigging control system of claim 16, wherein the manually operated counterweight hoist further includes one or more visual indicators; and wherein the controller is further configured to activate the one or more visual indicators when it is time for an operator to move the manually operated counterweight hoist.

22. The rigging control system of claim 16, further comprising a motorized hoist, wherein the system control device is configured to control operation of the motorized hoist.

* * * * *